United States Patent
Ostrowski et al.

[15] 3,667,095
[45] June 6, 1972

[54] APPARATUS FOR COATING SURFACES AND CURING THE SAME AT HIGH SPEEDS

[72] Inventors: Arthur E. Ostrowski, Alsip; Raffaele Basile, Chicago, both of Ill.

[73] Assignee: Allied Tube & Conduit Corporation, Harvey, Ill.

[22] Filed: Dec. 17, 1969

[21] Appl. No.: 885,824

[52] U.S. Cl. .............................................29/33 D, 118/643
[51] Int. Cl. ...................................B23p 35/00, B23k 31/02
[58] Field of Search ...........................29/33 D; 118/643, 642

[56] References Cited

UNITED STATES PATENTS

| | | | |
|---|---|---|---|
| 3,524,245 | 8/1970 | Searing | 29/33 D |
| 3,068,119 | 12/1962 | Gotsch | 118/642 X |
| 3,122,114 | 2/1964 | Kringel et al | 29/33 D |
| 3,322,099 | 5/1967 | Valle | 118/642 |
| 3,338,738 | 8/1967 | Lindemann | 118/642 X |

*Primary Examiner*—Andrew R. Juhasz
*Assistant Examiner*—Z. R. Bilinsky
*Attorney*—McDougall, Hersh & Scott

[57] ABSTRACT

A machine for galvanizing and coating of steel tubing operating continuously to achieve high rates of production is provided with means for applying a protective film to a tube formed from strip steel and coated with zinc and includes means for removing the solvent from the film material and curing the material after the coating has been applied. The means includes a multistage heating apparatus to sequentially remove the solvent and cure the material.

5 Claims, 4 Drawing Figures

INVENTOR
Arthur E. Ostrowski, et al
by McDougall, Hersh, Scott
and Ladd
Attys

APPARATUS FOR COATING SURFACES AND CURING THE SAME AT HIGH SPEEDS

BACKGROUND OF THE INVENTION

This invention relates to a machine for continuously forming and galvanizing tubing and other shapes of endless strips of steel. More particularly, it relates to improvements in such machines which apply a protective coating to the tubing in a continuous manner.

The patent to Krengel et al. U.S. Pat. No. 3,122,114 discloses a machine for "Continuous Tube Forming and Galvanizing". The machine discloses in that patent is capable of producing large quantities of galvanized tubing at relatively high rates of production with the advantage of achieving great economy. Whereas much of the tubing produced by a machine of the type shown in this patent has a market when the outer surface is galvanized or coated with zinc, there is a need for tubing which not only has such a coating, but in addition, has another coating or protective film. Such an additional coating has the advantage of protecting the tubing from weathering, protecting the zinc from tarnishing and generally protecting the tubing from harmful environmental situations such as are found in various atmospheres to which the tubing might be exposed. In addition, there is a need for tubing to which coatings have been applied over the zinc for appearance purposes; for instance, to provide colored tubing for use in furniture and other consumer products.

Heretofore such coatings or protective films have been applied to galvanized tubing using hand or other discontinuous methods after the tubing has been cut into desired lengths. These methods are, of course, relatively expensive and fail to achieve all the advantages to be gained from methods and machines capable of continuously forming and galvanizing the tubing.

Therefore, it is an object of this invention to provide a novel machine for the continuous forming, galvanizing and coating of tubing.

It is another object of this invention to provide a novel machine for forming, coating and galvanizing tubing which is capable of relatively high rates of production.

The invention achieves these and other objects by providing an improved tube forming and galvanizing machine which includes means for continuously apply a protective film or coating to the galvanized tubing and also continuously dries and cures the coating so applied.

BRIEF DESCRIPTION OF THE FIGURES

The subject matter which is regarded as the invention is particularly pointed out and distinctly claimed in a concluding portion of this specification. An embodiment of the invention both as to its structure and manner of operation together with further objects and advantages thereof may be best understood by reference to the following description taken in connection with the accompanying drawing in which:

DETAILED DESCRIPTION

Figure 2:
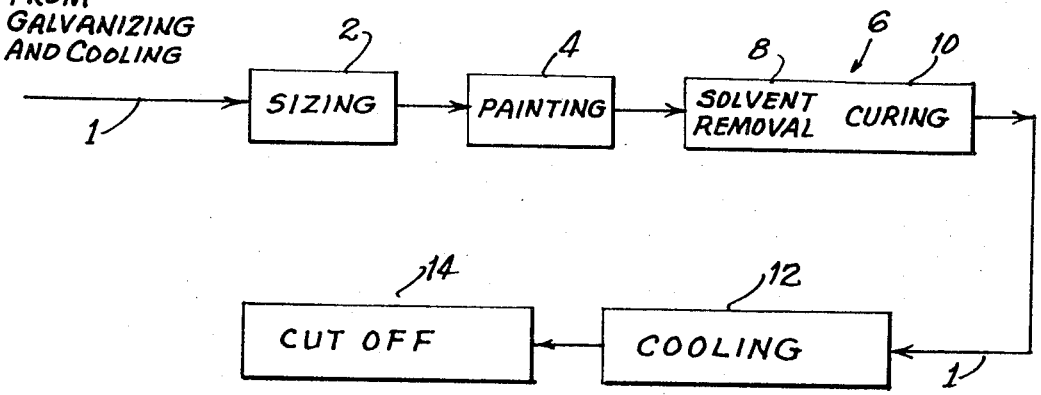
FIG. 2 is a diagrammatic illustration of a portion of a continuous forming, galvanizing and coating machine in accordance with the invention.
Figure 3:
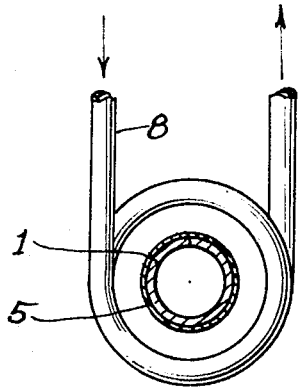
FIG. 3 is an end view of heating means and coated tubing in accordance with the invention.

Referring first to FIG. 2, there is illustrated in diagrammatic form that portion of a machine for continuously forming, galvanizing and coating tubing at high speeds with which this application is particularly concerned. While this application discloses embodiments of the invention in which the product of the machine is tubing, it should be understood that the invention's utility is not limited to the production of cylindrical tubing but that it may also be useful in continuous machines for forming, galvanizing and coating other shapes such as tubing of various cross-sectional configurations and rolled or partially rolled forms of any number of shapes such as shaped strip or profiled strip. The structure and operation of a machine for continuously forming and galvanizing tubing forming a part of this invention is disclosed in the patent to Krengel et al. U.S. Pat. No. 3,122,114 which disclosure is hereby incorporated into this application by reference, particularly, those portions of the disclosure of that patent which show and describe a continuous tube forming and galvanizing machine up to tube sizing rolls designated by reference numeral 192 in that patent.

It may be seen in FIG. 2 tubing 1 which has been formed from strip steel and welded and then galvanized passes from a cooling stage to the tube sizing rolls which are represented by the block 2 in FIG. 2. The apparatus represented by this block reduces the diameter of the formed tubing to a desired size by the action of the rolls. The tubing then passes through an in line painting apparatus 4. The apparatus 4 may take any one of a number of conventional forms such as spraying using air, airless or electrostatic methods, etc. The paint, coating or protective film 5 to be applied by this apparatus should have the quality of resisting weathering and protecting the zinc from tarnishing due to adverse environmental or atmospheric elements and additionally may be used for decorative purposes. In addition, it should have the quality of adhering strongly to the surface of the galvanized tubing even when the tubing is subsequently bent into desired shapes by the users thereof. That is to say, it should have the quality of being flexible so as to be bent without cracking or breaking away from the surface of the tubing. It has been found that films made from thermosetting acrylic and silicon copolymer resins have these desired qualities and such films may be applied as the protective film to the tubing either with or without pigmenting or coloring agents.

Since such films include solvents to facilitate their application to a surface and since they are thermosetting films, it is necessary in order to complete the coating operation to remove the solvents and cure the film. To this end, the invention provides an in line multistage heating apparatus 6 downstream in the machine of the painting apparatus 4. The apparatus 6 includes a first stage 8 producing heat sufficient to raise the temperature of the coated tube to a value sufficient to remove the solvents. A second in line heating stage 10 is spaced downstream of the stage 8 a distance sufficient to allow time for the solvents to leave the coating. This stage has a heat capacity sufficient to raise the temperature of the coated tubing to a second and higher range in order to effect the curing of the resin material.

In one embodiment of the invention where the machine is being operated to produce tubing continuously at the rate of 150–450 ft. per minute, it has been found that if the heat applied by heating stage 8 is sufficient to raise the temperature of the coated tubing to a range of 150° to 300° F., the solvent contained in the coating material will be removed. At the same time the heat supplied by the heating stage 10 should be sufficient to raise the temperature of the coated tubing to a range of 400° to 700° F. in order to effect curing of this material.

In one embodiment of the invention where the coating being applied has a thickness in excess of approximately 0.3 mils it is important that the two stage heating apparatus 6 be provided. If it is attempted to raise the temperature of the coated tubing rapidly in an effort to effect a drying and curing in one operation, it will be found that the coating will blister as the solvents and possible by products of a chemical reaction will rapidly boil off and cause this phenomenon to occur. Because the rapid boiling of solvents may occur in any coating which contains a solvent and blistering is undesirable, another use for the invention may be its application to machines which are coating galvanized strips or shapes with such materials. In this case, the multistage heating apparatus would be used to effect solvent removal in its various stages at a controlled rate of temperature increase to avoid rapid boiling.

After curing by the heating stage 10, the tubing may be passed to a cooling stage 12. It should be understood that whereas for convenience this is illustrated in the drawing as being below the stage previously described in the actual machine it is in line with all of the other elements of the machine in order to achieve the continuous high speed operation desired. The cooling stage may be constituted by one or more nozzle rings or series of nozzles encompassing the tubing and spraying water thereon. Alternating the cooling could be accomplished by passing the tubing through a water immersion bath. Likewise, in line with the remaining elements of the machine is a cut off apparatus 14 in the same manner as that described in U.S. Pat. No. 3,256,592.

Figure 1:
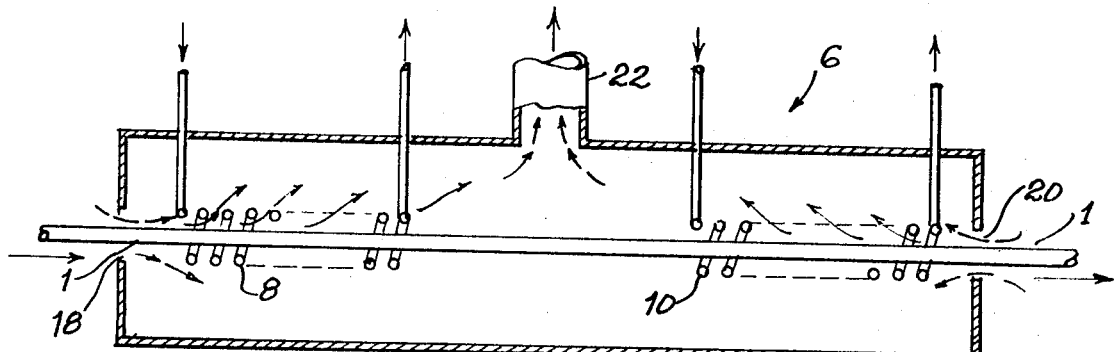
FIG. 1 is a schematic illustration of a drying and curing means in accordance with the invention.

FIG. 1 illustrates a first embodiment of the multistage heating means 6. This means is constituted by a protective housing 16 having openings 18 and 20 at each end thereof and supported in any suitable manner in the machine. The openings 18 and 20 are in line with the rest of the machine and the axis of the tubing 1 being fabricated so that the tubing will enter through the opening 18 and leave the housing 16 through the opening 20. Disposed inside of the housing is an induction heating coil constituting the first heating means 8 for effecting solvent removal. The heating coil encompasses the tubing and is connected to a suitable source of alternated current (not shown) to achieve the desired induction heating effect. As is conventional with such coils, they are formed as hollow elements and cooling water is circulated through them. Spaced along the length of the tubing inside the housing 16 and downstream of the first heating means 8 is the second heating means 10 for effecting the curing of the protective film or coating. This too is constituted by an induction heating coil encompassing the tubing and connected to a suitable source of electrical energy (not shown) and provided with cooling water. The housing 16 has connected thereto, by virtue of an opening provided in its wall, an exhaust vent 22 for providing an exit for the evaporated solvents removed from the coating material. It is desirable to have a suitable fan or other mechanical suction apparatus in the exhaust vent to draw off the evaporated solvents and additional openings may be provided in the housing to provide for the entry of air.

Figure 4:
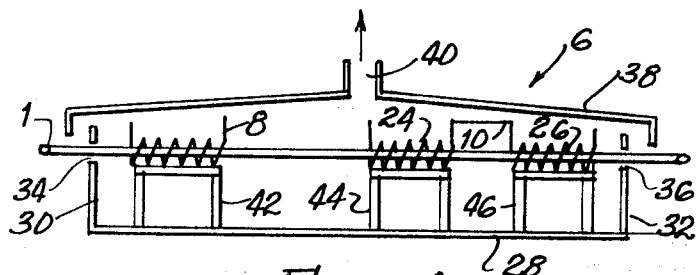
FIG. 4 is a diagrammatic illustration of an alternative embodiment of a drying and curing means in accordance with the invention.

In the event it is desired to coat the tubing with a film greater than 0.3 mils, the alternative embodiment of the drying and curing stage 6 shown in FIG. 4 may be used. This embodiment comprises the first heating stage 8 in order to effect solvent removal and spaced downstream along the length of the tubing from the heating stage 8 is a second heating stage 10 comprising a pair of induction heating coils 24 and 26 encompassing the tube. These coils can be connected in electrical series with each other and/or to a separate suitable source of electrical energy.

FIG. 4 also illustrates an alternative embodiment of a housing for the heating coils. In this embodiment the housing is constituted by a box like lower portion 28 having upstanding end walls 30 and 32 in which openings 34 and 36, respectively, are provided. As before, these openings and the housing are in line with the remainder of the machine in order that continuous high speed operation may be achieved. A hood 38 overlies the open tube of the bottom member 28 and is provided with an exhaust vent 40 for removal of the evaporated solvents. The coils 8, 24 and 26 may be supported by any suitable means represented diagrammatically in this drawing by the parts designated with reference numerals 42, 44 and 46.

Although in accordance with the provisions of the patent statutes, this invention is described as embodied in various forms and the principle has been explained together with the best mode in which it is now contemplated applying that principle, it will be understood that the apparatus shown and described is merely illustrative and the invention is not limited thereto since alterations and modifications will readily suggest themselves to persons skilled in the art without departing from the true spirit of the invention or from the scope of the annexed claims.

What is claimed as new and desired to secure by Letters Patent of the United States is:

1. In a machine for the continuous forming, galvanizing and coating of tubing including means for continuously feeding an endless strip of steel to the machine, means forming the strip into rounded shape to bring the lateral edges together, welding means for joining the free edges of the strip steel in a continuous seam to form completely enclosed lengths of tubing, means for applying molten zinc onto the surface of the formed tubing and means for coating the tubing into predetermined lengths, the improvement comprising means for applying a thermosetting protective film on the outer surface of the formed tubing, and first heating means comprising an induction heating coil encompassing said formed tubing having a capacity sufficient to raise the temperature of the formed tubing and the protective film to a range of 150° to 350° F, for drying the protective film mounted in the machine downstream of said protective film applying means and second heating means comprising an induction heating means having a capacity sufficient to raise the temperature of the formed tubing and the protective film to a range of 400° to 700° F. for curing the protective film mounted downstream of said first heating means.

2. In the machine of claim 1 wherein said induction heating means comprising said second heating means comprises a single induction heating coil encompassing said formed tubing.

3. In the machine of claim 2 wherein the improvement further comprises an elongated housing having its longitudinal axis in line with the axis of the formed tubing and having openings at each end thereof through which said formed tubing may pass; said first and second heating means being mounted in said housing; and exhaust means having a connection to the interior of said housing for drawing off solvents evaporated from the protective film as a result drying it.

4. In the machine of claim 1 wherein said induction heating means comprising said second heating means comprises a pair of induction heating coils spaced axially along the length of formed tubing and connected in series with each other.

5. In the machine of claim 4 wherein the improvement further comprises an elongated housing having its longitudinal axis in line with the axis of the formed tubing and having openings at each end thereof through which said formed tubing may pass; said first and second heating means being mounted in said housing; and exhaust means having a connection to the interior of said housing for drawing off solvents evaporated from the protective film as a result drying it.

* * * * *